April 30, 1929.  M. BOYKO  1,711,404

NONPNEUMATIC TIRE TUBE

Filed Oct. 4, 1928    2 Sheets-Sheet 1

INVENTOR.
Michael Boyko.
BY
Bryant & Lowry
ATTORNEYS

April 30, 1929. M. BOYKO 1,711,404
NONPNEUMATIC TIRE TUBE
Filed Oct. 4, 1928 2 Sheets-Sheet 2
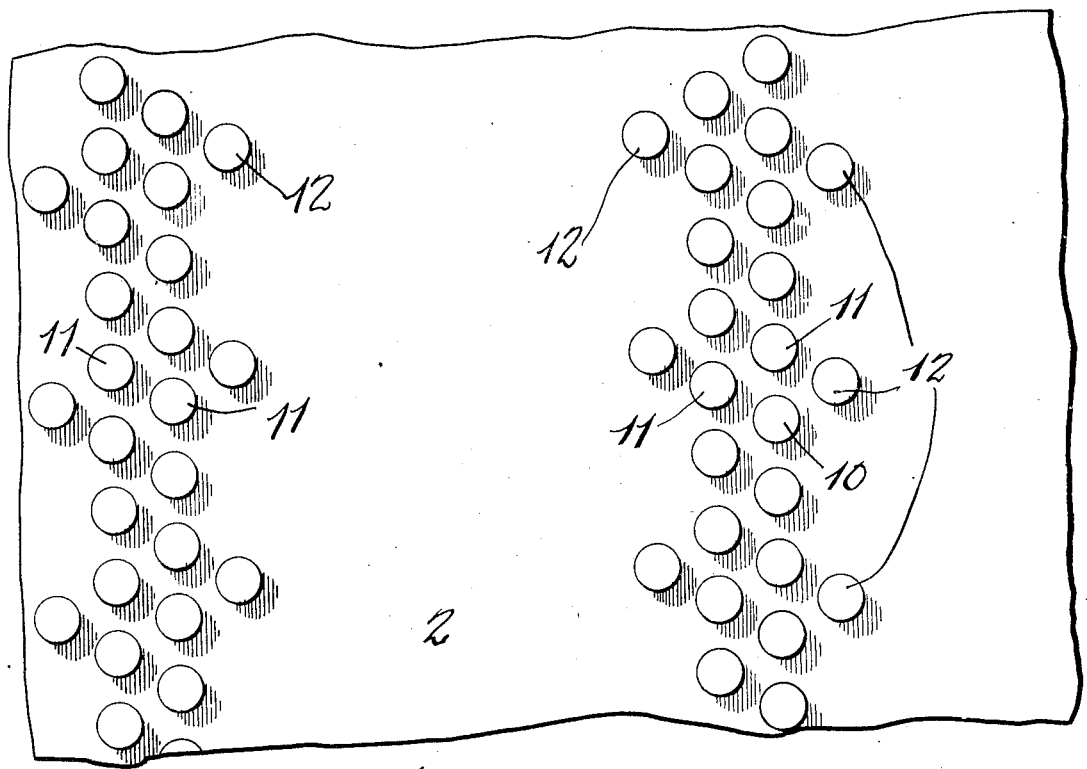
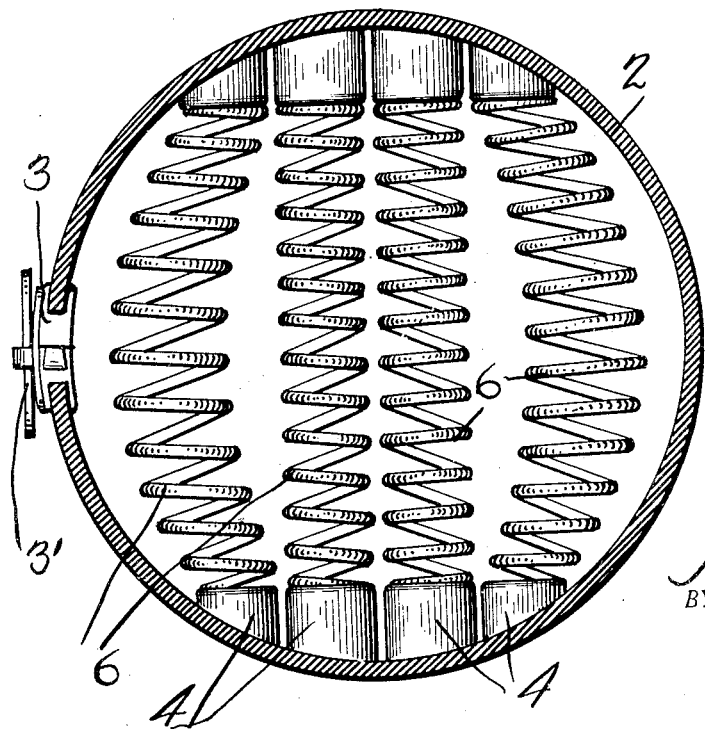
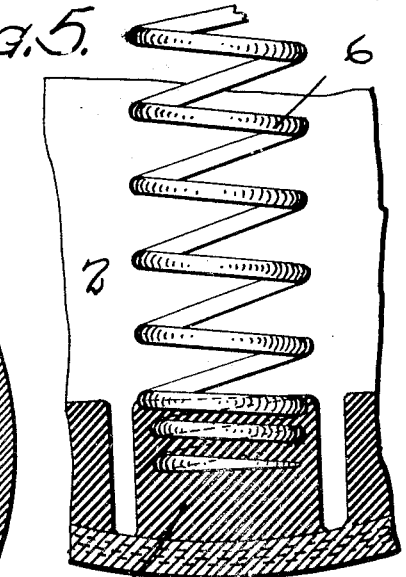
INVENTOR.
Michael Boyko.
BY Bryant & Lowry
ATTORNEYS Patented Apr. 30, 1929.

1,711,404

UNITED STATES PATENT OFFICE.

MICHAEL BOYKO, OF CLEVELAND, OHIO.

NONPNEUMATIC-TIRE TUBE.

Application filed October 4, 1928. Serial No. 310,401.

This invention has relation to inner tubes for rubber tires for the wheels of automobile vehicles, and particularly for trucks, the tires of which are nonpneumatic.

The object of the invention is to provide a novel inner tube of resilient character, in which the proper degree of resiliency is obtained by the use of metal springs, so arranged interiorly of the tube as to respond to the outward pressure to a degree similar to that of a pneumatic tire tube.

The invention consists in the novel construction and combination of parts, hereinafter described and claimed, characterized by the fact that the springs are imbedded at their ends in nipples projecting from and integral with the wall of the tube and that they are arranged in distinct groups of a character that will promote the best results.

In the accompanying drawings, illustrating a preferential embodiment of the characteristics and novel embodiment of my invention.

Fig. 3 is a fragmentary plan view of the interior of the tube, opened and spread out flatwise.

Fig. 4 is a transverse sectional view, and

Fig. 5 is a fragmentary transverse sectional view of a portion of the tube and its interior equipment.

Figure 1:
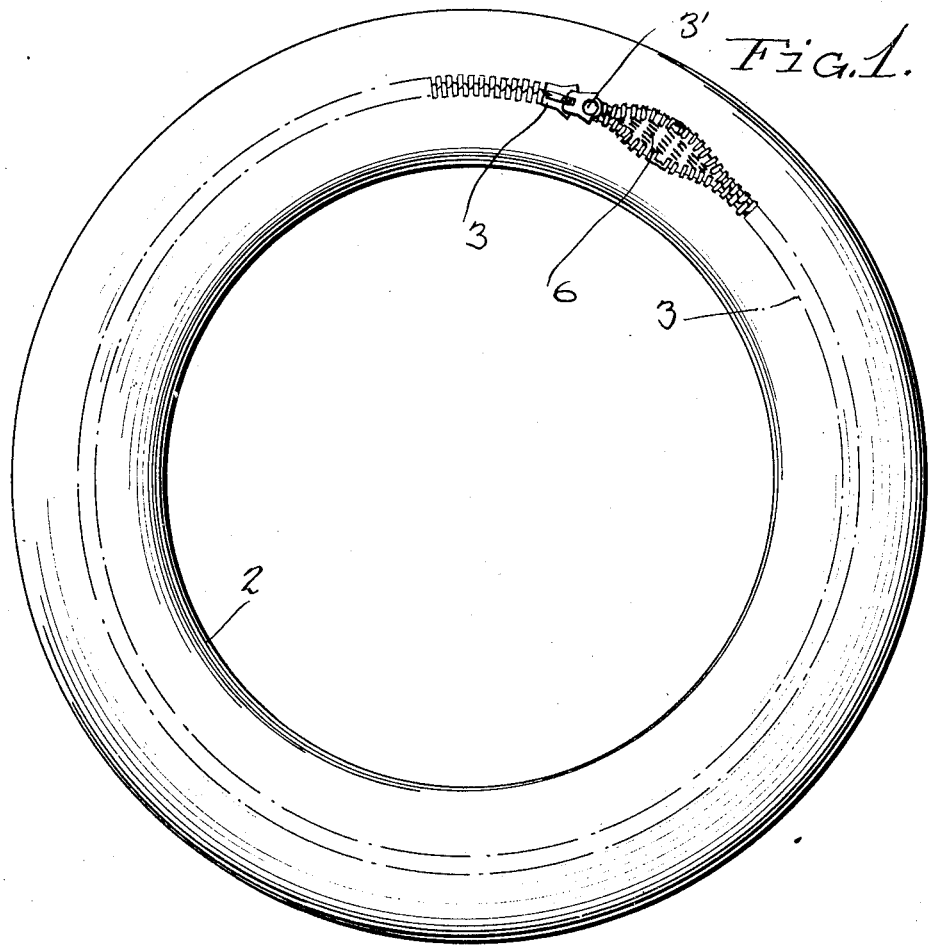
Fig. 1 is a side view of the tire, particularly illustrating the means for opening and closing the gap in the tire tube.
Figure 2:
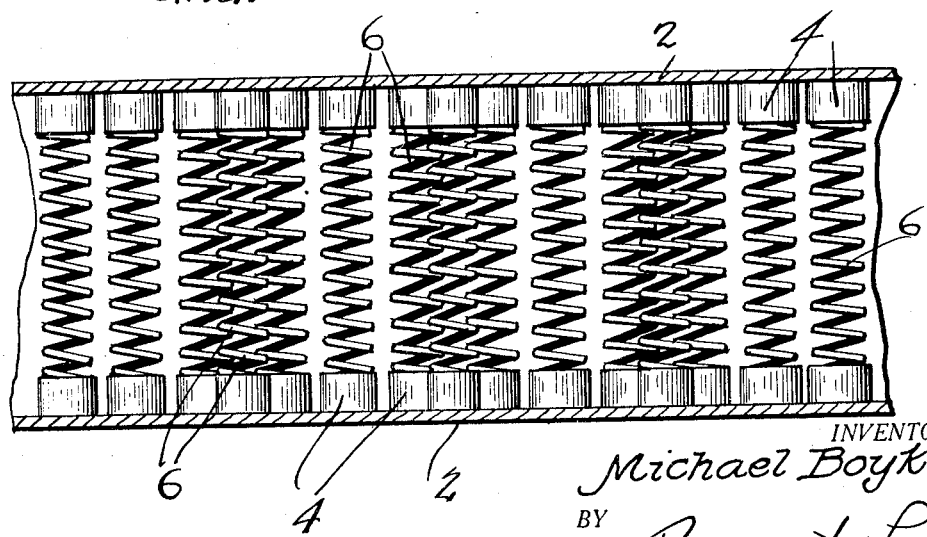
Fig. 2 is a fragmentary circumferential sectional view.

The numeral 2 designates a hollow rubber tire tube of the usual type, having a continuous gap 3, in one side, which when closed is so held by means of the well known "Zip" fastening means 3', which need not be particularly described.

The body or wall of the tube is of composite character consisting of rubber and fabric as indicated in Fig. 5. For the purposes of my invention, I provide the interior of the tube with a multitude of inwardly projecting nipples or bosses 4, arranged in groups, forming lines extending circumferentially of the wall of the tire, as shown in Fig. 3.

The bosses 4 of each line are arranged in staggered relation with those of each adjacent line so as to effectively distribute the strain imposed from the outside upon the springs 6. Each group of circumferentially extending rows 10, of bosses comprises two lines 11—11, parallel to each other and closely related, while each other two lines 12—12 are outside the lines 11, 11, and are composed of bosses wider apart than the bosses of the intermediate lines.

The springs are spirally wound and form a plurality of circumferential row in spaced relation to each other, as distinctly represented in Fig. 3. The ends of the springs are embedded in the bosses 4, which are cemented or vulcanized upon the inner surface of the tube at both the inner and outer circumferences.

Fig. 4 illustrates the tube equipped with four circumferential rows of springs, and it will be noted that the outermost circumferential rows are composed of springs which taper toward each end and are of arcuate form so as to be approximately concentric with the tube in cross section.

As will be seen the interior of the tube is so equipped with the springs as to produce a resilient cushioning effect in which the strain or pressure is fully distributed, and any tendency to flatten or become distorted, obviated.

As may be observed, the outermost of the springs are less in number than those of the intermediate rows and are therefore of greater resiliency than the intermediate rows of springs.

What I claim is:—

1. A non-pneumatic tire tube consisting of a hollow annular body of circular form in cross section, having a gap in one side, and a closure therefor and having a series of spiral springs located therein and arranged in spaced circumferentially disposed groups, said springs being substantially radial to the tube and said tube having interior projecting bosses attached thereto, and having the ends of the springs imbedded therein.

2. A non-pneumatic tire tube, formed of composite rubber and fabric, having attached to its inner wall surfaces rubber bosses, and containing a plurality of spiral springs radially disposed in groups and having their ends imbedded in said bosses.

3. A non-pneumatic tire tube comprising a hollow annular body of circular form in cross section, circumferential series of radial bosses extending inwardly from the inner and outer sides of the inner faces of the tube, said bosses being arranged in opposed relation and transversely staggered and radial coil springs connected at their ends to opposed bosses.

4. A non-pneumatic tire tube comprising a hollow annular body of circular form in cross section, circumferential series of radial bosses extending inwardly from the inner and outer sides of the inner faces of the tube, said bosses being arranged in opposed relation and transversely staggered and radial coil springs imbedded at their ends in opposed bosses.

5. A non-pneumatic tire tube consisting of a hollow annular body of circular form in cross section and having a side opening gap, a sliding closure for the side gap, and a plurality of radial springs in the tube arranged in circumferential series and transversely staggered.

In testimony whereof I affix my signature.

MICHAEL BOYKO.